Patented Jan. 27, 1931

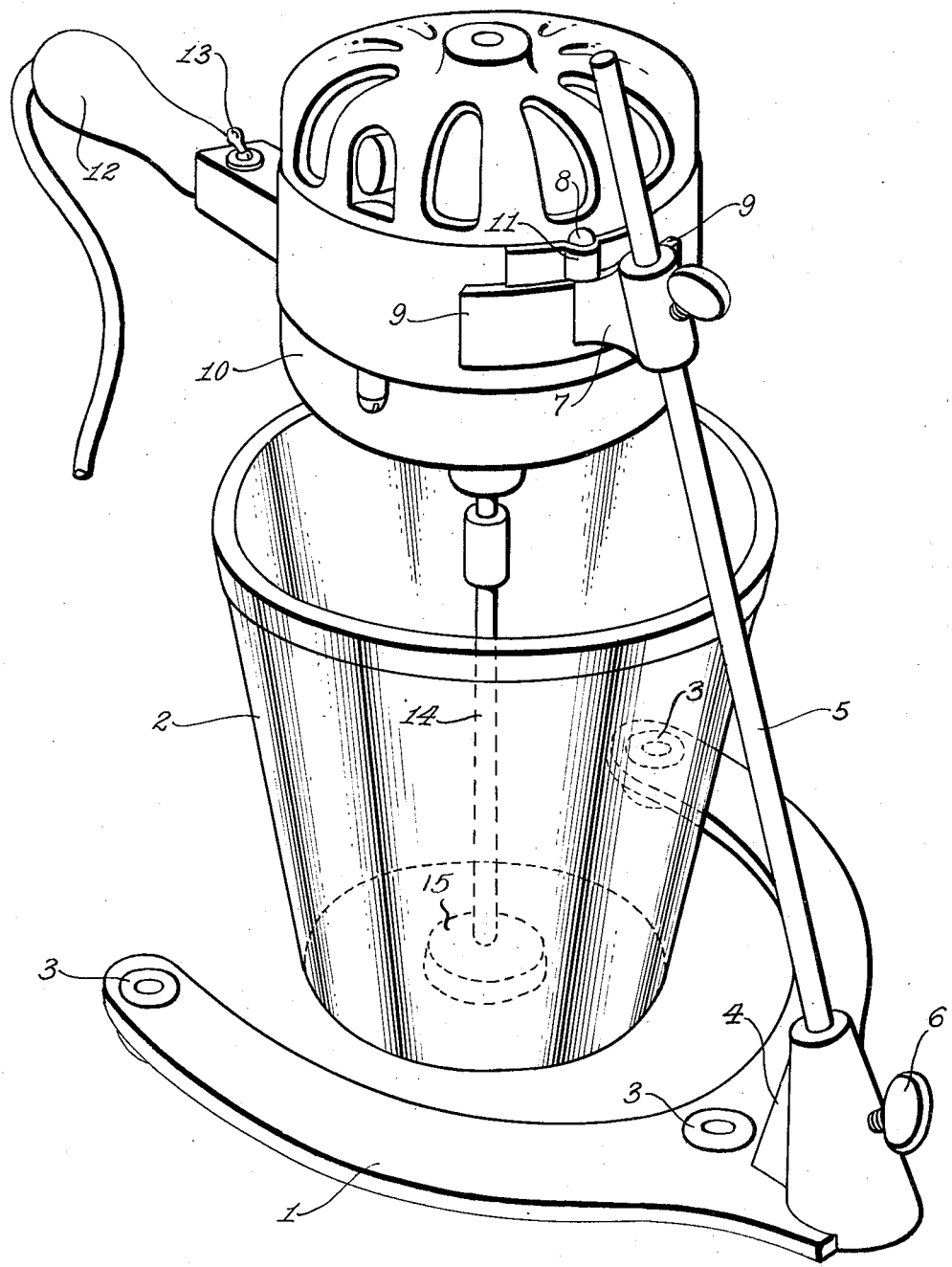

1,790,242

UNITED STATES PATENT OFFICE

EUGENE NEWNHAM, OF ST. LOUIS, MISSOURI, ASSIGNOR TO GALVIN ELECTRIC MFG. CO., OF ST. LOUIS, MISSOURI, A CORPORATION OF MISSOURI

MIXER

Application filed December 17, 1928. Serial No. 326,554.

This invention pertains to mixers such as are used at soda fountains, and the like, for mixing beverages of various kinds.

One of the objects of this invention is to provide such a mixer which will be portable and arranged for convenient use in a private home.

Another object is to provide such a mixer in which the motor is arranged to be conveniently removable and is provided with a handle for easy manipulation.

Another object is to provide such a mixer which may be used in connection with an ordinary type of bowl or container for holding the material to be mixed.

Further objects will appear from the following description taken in connection with the accompanying drawing in which The figure is a perspective view of the mixer embodying this invention.

Referring to the drawing 1 designates a base of horseshoe form having its arms widely separated so as to be able to embrace a bowl or receptacle 2 of any ordinary form. The base 1 may be provided with rubber pads or feet 3 upon which it rests so as to avoid marring the support on which it is placed. The base is provided with an angle bracket 4 in which is removably mounted an upright standard 5. The standard 5 may be clamped in the bracket 4 by means of a set screw 6, or other suitable device. The standard 5 is mounted at a forward inclination so that its upper portion extends over the gap between the arms of the base 1.

Slidably mounted upon the standard 5 for adjustment therealong is a bracket 7 provided with an upstanding pin 8 and a pair of outspread arms 9 adapted to provide an abutment for the motor 10. The motor is provided with an eye 11 adapted to receive the pin 8. The motor is also provided with a handle 12 by which it may be manipulated. The switch 13 may also be provided on the motor frame for starting and stopping the same. The shaft 14 of the motor is provided at its lower end with a stirring member 15.

In the use of this device, any suitable receptacle such as the glass bowl 2 is placed within the arms of the base 1, said receptacle containing the material to be mixed. The motor 10 is then placed with its shaft dipping into the receptacle 2 and is set upon the support with its eye 11 over the pin 8 and the motor frame resting against the abutments 9. This supports the motor in a position with the shaft substantially vertical. The height of the mixing member 15 within the receptacle may be adjusted by adjusting the bracket 7 along the inclined standard 5. The motor may then be started by manipulating the switch 13 so that the element 15 will be driven in rotation for mixing the material.

It is seen, therefore, that this invention provides a simple and effective mixing device for home use. The horseshoe base provides for use in conjunction with any ordinary household utensil. The inclined standard 5 carries the weight of the motor forward over the center of support of the base 1 so that a very stable mounting is provided. The motor is easily mounted or dismounted from the support and is easily manipulated by means of the handle. The switch 13 is placed adjacent the handle where it may conveniently be operated by the thumb. A device is therefore provided which is simple in its operation and safe as a household article. It is obvious that various changes may be made in details of construction and operation, within the scope of the appended claims, without departing from the spirit of this invention; it is, therefore, to be understood that this invention is not to be limited to the specific details shown and described.

Having thus described the invention, what is claimed is:

1. A portable mixer, comprising, a horseshoe base adapted to embrace a receptacle, a standard mounted at an inclination on said base, a motor provided with a stirring element on its shaft mounted on the upper part of said standard, and means for adjusting said motor along said standard.

2. A portable mixer, comprising, a horseshoe base adapted to embrace a receptacle, a standard mounted at an inclination on said base, a motor having a handle and provided with a stirring element on its shaft, and means for detachably mounting said motor on said standard.

3. A portable mixer, comprising, a horseshoe base adapted to embrace a receptacle, a standard mounted at an inclination on said base, a motor having a handle and provided with a stirring element on its shaft, and means for detachably mounting said motor on said standard at an adjusted position therealong.

4. A portable mixer, comprising, a horseshoe base adapted to embrace a receptacle, a standard mounted at an inclination on said base, a bracket adjustable along said standard, and a motor detachably mounted on said bracket with its shaft substantially vertical, said motor having a stirring element on its shaft.

5. A portable mixer, comprising, a horseshoe base adapted to embrace a receptacle, a standard mounted at an inclination at said base, a bracket adjustable along said standard and having an upstanding pin, and a motor provided with a stirring element on its shaft and having an eye adapted for engagement with said pin to support said motor.

6. A portable mixer, comprising, a horseshoe base adapted to embrace a receptacle, a standard mounted at an inclination at said base, a bracket adjustable along said standard and having an upstanding pin and an abutment therebelow, and a motor provided with a stirring element on its shaft and having an eye adapted for engagement with said pin while the motor engages said abutment, whereby said motor is supported with its shaft substantially vertical.

7. A portable mixer, comprising, a horseshoe base adapted to embrace a receptacle, a standard mounted at an inclination on said base, a bracket adjustable along said standard and having an upstanding pin and a pair of outspread arms providing an abutment therebelow, and a motor provided with a stirring element on its shaft and having an eye adapted for engagement with said pin while the motor engages said abutment whereby said motor is supported with its shaft substantially vertical.

8. A portable mixer, comprising, a horseshoe base adapted to embrace a receptacle, a standard mounted at an inclination on said base so as to lean over the receptacle, a bracket adjustable along said standard, and a motor provided with a handle and having a stirring element on its shaft detachably mounted on said bracket.

9. A portable mixer, comprising, a horseshoe base adapted to embrace a receptacle, an angle lug on said base having a socket, a standard removably mounted in said socket so as to incline upwardly over the receptacle, a motor support mounted for adjustment along said standard, and a motor provided with a handle and having a stirring element on its shaft detachably mounted on said support.

In testimony whereof I affix my signature this 12th day of Sept. 1928.

EUGENE NEWNHAM.